Patented Jan. 9, 1940

2,186,406

UNITED STATES PATENT OFFICE 2,186,406

RESINOUS PRODUCT

Harry M. Dent, Eggertsville, and Alvin F. Shepard, Kenmore, N. Y., assignors to General Plastics, Inc., North Tonawanda, N. Y.

No Drawing. Application June 3, 1937, Serial No. 146,243

6 Claims. (Cl. 260—25)

This invention relates to synthetic resinous products and their method of manufacture and more particularly to reaction products of certain natural resins of plant origin and hydroxypolymethylol benzene.

The natural resins of plant origin reacted with the hydroxymethylol benzene comprise the various natural gums designated as accroides, dragon's blood and the like. The chemical compounds reacted with this gum with the production of resin suitable for use as a molding compound comprise the salts or pure compounds of the hydroxypolymethylol benzene series such as 1-hydroxy, 2,4 dimethylol benzene. These compounds contain at least one hydroxy group and at least two methylol groups. The relative position of attachment of these groups to the benzene nucleus appears to be immaterial, but for economy of operation 1-hydroxy, 2,4 dimethylol benzene is preferred.

The hydroxypolymethylol benzene reacts with the gum accroides over a wide range of proportions to produce excellent thermo setting resins. In general the parts of gum are within the range 20–80 to 80–20 parts of hydroxypolymethylol benzene. The reaction or condensation proceeds in the presence of either acid or alkaline catalysts, including certain metal salts, although somewhat better control of the reaction is possible with alkaline catalysts. The amount of catalyst employed will vary depending upon the nature of the catalyst and physical condition of the reaction mixture. In general the amount of catalyst will not exceed about 10% of the reaction mixture. Where salts of the hydroxypolymethylol benzene are combined or reacted with accroides gum no catalyst is necessary for facilitating union. In general the hydroxypolymethylol benzene and the gum are heated, under reflux if desired, until bubbling of the reaction mixture indicates that reaction and condensation is proceeding, whereupon the temperature is maintained at reacting temperature until resin formation is completed.

The hydroxypolymethylol derivatives and its homologs, cresol, xylenol, etc., have been prepared and their properties studied. In general, these compounds are well crystallized materials easily obtained in the pure state. Thus, the dimethylol derivative of orthocresol is a well defined crystalline material with melting point 94° C., as are the dimethylol derivatives of paracresol, paratertiary amyl phenol, metacresol and symmetrical xylenol.

A resinous product produced by reaction in the presence of caustic soda as a catalyst from about 65 parts of gum accroides and 35 parts of the dimethylol derivative of orthocresol cures moderately slowly and the complete cure was obtained in about 6 to 7 minutes. By increasing the proportion of dimethylol derivative the cure at 165° C. can be somewhat accelerated and a resin obtained by reacting equal parts of the gum and dialcohol cures in about 1½ to 3 minutes.

Somewhat more rapid rates of curing are possessed by the resinous products produced by the reaction of the natural gum with dimethylol phenol, metacresol dialcohol and symmetrical xylenol dialcohol.

Thus, by reacting 30 parts of metacresol dialcohol with dragon's blood in the presence of zinc chloride by heating the products under refluxing conditions until a resin is obtained, a product is formed curing in about 3 to 4 minutes at 165° C., which time of cure can be decreased to about 1 to 1½ minutes by increasing the quantity of metacresol dialcohol to 50 parts and decreasing the dragon's blood to 50 parts.

From the foregoing, it will be seen that the present invention provides a resinous material of thermo setting character that can be advanced or cured in a relatively short period of time to a hard, set infusible and insoluble material, a substance suitable for use as a molding compound and a resinous product that can be readily and easily produced in acid, alkaline or neutral conditions or with the aid of metallic salts as catalysts.

We claim:

1. The method of producing a resin which comprises reacting a mixture consisting of gum accroides and hydroxypolymethylol benzene having at least two carbinol groups attached to the benzene nucleus.

2. The method of producing a resin which comprises heating a mixture consisting of gum accroides and an hydroxypolymethylol benzene having at least two carbinol groups attached to the benzene nucleus.

3. The method of producing a resin which comprises refluxing a mixture consisting of a gum accroides and hydroxypolymethylol benzene having at least two carbinol groups attached to the benzene nucleus.

4. The resinous reaction product resulting from the reaction of the ingredients of a mixture consisting of gum accroides and hydroxypolymethylol benzene having at least two carbinol groups attached to the benzene nucleus.

5. The resinous reaction product resulting from the reaction of the ingredients of a mixture consisting of gum accroides and a salt of hydroxy-polymethylol benzene having at least two carbinol groups attached to the benzene nucleus.

6. The resinous reaction product resulting from the reaction of the ingredients of a mixture consisting of gum accroides and an alkali metal salt of 1-hydroxy, 2,4 dimethylol benzene.

HARRY M. DENT.
ALVIN F. SHEPARD.